United States Patent [19]

Thomson

[11] Patent Number: 5,634,051
[45] Date of Patent: May 27, 1997

[54] INFORMATION MANAGEMENT SYSTEM

[75] Inventor: William K. Thomson, Spring Valley, Ohio

[73] Assignee: Teltech Resource Network Corporation, Minneapolis, Minn.

[21] Appl. No.: 585,383

[22] Filed: Jan. 11, 1996

Related U.S. Application Data

[63] Continuation of Ser. No. 144,767, Oct. 28, 1993, abandoned.

[51] Int. Cl.⁶ .................................................. G06F 17/30
[52] U.S. Cl. ...................... 395/605; 364/DIG. 1; 364/282.1; 364/282.4
[58] Field of Search ............................... 395/600

[56] References Cited

U.S. PATENT DOCUMENTS

| | | | |
|---|---|---|---|
| 4,542,477 | 9/1985 | Noyori et al. | 364/900 |
| 4,648,046 | 3/1987 | Copenhaver et al. | 395/131 |
| 4,703,425 | 10/1987 | Muraki | 364/419 |
| 4,879,648 | 11/1989 | Cochran et al. | 395/275 |
| 5,109,509 | 4/1992 | Katayama et al. | 395/600 |
| 5,151,857 | 9/1992 | Matsui | 364/419 |
| 5,175,814 | 12/1992 | Anick et al. | 395/161 |
| 5,197,005 | 3/1993 | Shwartz et al. | 364/419 |
| 5,241,671 | 8/1993 | Reed et al. | 395/600 |
| 5,369,778 | 11/1994 | San Soucie et al. | 395/800 |
| 5,371,673 | 12/1994 | Fan | 364/419.01 |

OTHER PUBLICATIONS

Seaching on Dialog, Dialog Information Services, Inc, Palo Alto, CA, pp. 51, 18, 24, 26, 283, 1992.

Text Search and Retrieval Reference Manual, U.S. Patent and Trademark Office, Dec. 3, 1991, excerpt pp. p1–p7.

Chen, Hsinchun, et al; "Generating, Integrating, and Activating Thesauri for Concept-Based Document Retrieval," *IEEE Xepert*, Apr. 1993, pp. 25–34.

*Primary Examiner*—Wayne Amsbury
*Attorney, Agent, or Firm*—Fredrikson & Byron, P.A.

[57] ABSTRACT

An information storage, searching and retrieval system for large (gigabytes) domains of archived textual dam. The system includes multiple query generation processes, a search process, and a presentation of search results that is sorted by category or type and that may be customized based on the professional discipline (or analogous personal characteristic of the user), thereby reducing the amount of time and cost required to retrieve relevant results.

22 Claims, 5 Drawing Sheets

INFORMATION MANAGEMENT SYSTEM

This application is a continuation, of application Ser. No. 08/144,767, filed Oct. 28, 1993, abandoned.

FIELD OF THE INVENTION

This invention relates to an information storage, searching and retrieval system that incorporates a novel organization for presentation of search results from large (gigabytes) domains of archived textual data.

BACKGROUND OF THE INVENTION

On-line information retrieval systems are utilized for searching and retrieving many kinds of information. Most systems used today work in essentially the same manner; that is, users log on (through a computer terminal or personal microcomputer, and typically from a remote location), select a source of information (i.e., a particular database) which is usually something less than the complete domain, formulate a query, launch the search, and then review the search results displayed on the terminal or microcomputer, typically with documents (or summaries of documents) displayed in reverse chronological order. This process must be repeated each time another source (database) or group of sources is selected (which is frequently necessary in order to insure all relevant documents have been found). Additionally, this process places on the user the burden of organizing and assimilating the multiple results generated from the launch of the same query in each of the multiple sources (databases) that the user needs (or wants) to search. Present systems that allow searching of large domains require persons seeking information in these domains to attempt to modify their queries to reduce the search results to a size that the user can assimilate by browsing through them (thus, potentially eliminating relevant results).

In many cases end users have been forced to use an intermediary (i.e., a professional searcher) because the current collections of sources are both complex and extensive, and effective search strategies often vary significantly from one source to another. Even with such guidance, potential relevant answers are missed because all potentially relevant databases or information sources are not searched on every query. Much effort has been expended on refining and improving source selection by grouping sources or database files together. Significant effort has also been expended on query formulation through the use of knowledge bases and natural language processing. However, as the groupings of sources become larger, and the responses to more comprehensive search queries become more complete, the person seeking information is often faced with the daunting task of sifting through large unorganized answer sets in an attempt to find the most relevant documents or information.

SUMMARY OF THE INVENTION

The invention provides an information storage, searching and retrieval system for a large domain of archived data of various types, in which the results of a search are organized into discrete types of documents and groups of document types so that users may easily identify relevant information more efficiently and more conveniently than systems currently in use. The system of the invention includes means for storing a large domain of data contained in multiple source records, at least some of the source records being comprised of individual documents of multiple document types; means for searching substantially all of the domain with a single search query to identify documents responsive to the query; and means for categorizing documents responsive to the query based on document type, including means for generating a summary of the number of documents responsive to the query which fall within various predetermined categories of document types.

Preferably the means for categorizing documents and generating the summary includes a plurality of predetermined sets of categories of document types, and further includes means for automatically customizing the summary by automatically selecting one of the sets of categories, based on the identity of the user or a characteristic of the user (such as the user's professional position, technical discipline, industry identity, etc.), for use in preparing the summary. In this way, the summary for an individual user is automatically customized to a format that is more easily and efficiently utilized and assimilated. Alternately, the set of categories selected may be set up to allow the user to select a desired set of categories for use in summarizing the search results.

The invention also relates to a method of storing, searching and retrieving information for use with a large domain of archived data of various types. The method involves storing in electronically retrievable form a large domain of data contained in documents obtained from multiple source records, at least some of the source records containing documents of multiple types; generating an electronically executable search query; electronically searching at least a substantial portion of such data based on the query to identify documents responsive to the query; and organizing documents responsive to the query and presenting a summary of the number of documents responsive to the query by type of document independently of the source record from which such documents were obtained.

Preferably the method also involves defining one or more sets of categories of document types, each category corresponding to one or more document types, selecting one of the sets of categories for use in presenting a summary of the results of the search, and then sorting documents responsive to the query by document type utilizing the selected set of categories, facilitating the presentation of a summary of the number of documents responsive to the query which fall within each category in the selected set of categories.

The selection of the set of categories to be utilized may be performed automatically based on predetermined criteria relating to the identity of or a personal characteristic of the user (such as the user's professional background, etc.), or the user may be allowed to select the set of categories to be used.

The query generation process may contain a knowledge base including a thesaurus that has predetermined and embedded complex search queries, or use natural language processing, or fuzzy logic, or tree structures, or hierarchical relationship or a set of commands that allow persons seeking information to formulate their queries.

The search process can utilize any index and search engine techniques including Boolean, vector, and probabilistic as long as a substantial portion of the entire domain of archived textual data is searched for each query and all documents found are returned to the organizing process.

The sorting/categorization process prepares the search results for presentation by assembling the various document types retrieved by the search engine and then arranging these basic document types into sometimes broader categories that are readily understood by and relevant to the user.

The search results are then presented to the user and arranged by category along with an indication as to the number of relevant documents found in each category. The user may then examine search results in multiple formats, allowing the user to view as much of the document as the user deems necessary.

BEST MODE FOR CARRYING OUT THE INVENTION

Figure 1:
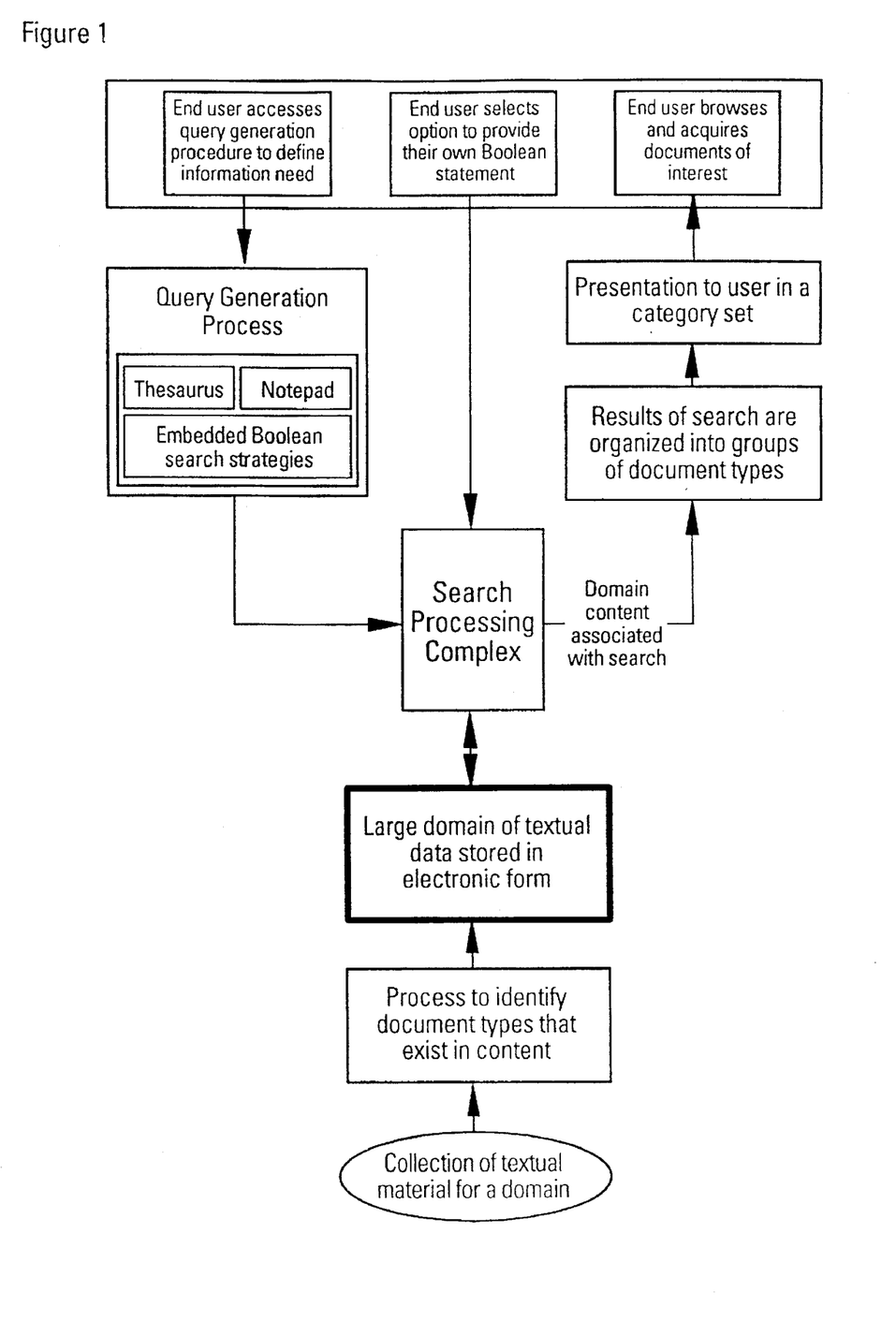
FIG. 1 is a block diagram illustrating an information retrieval system of the invention.

As is illustrated in the block diagram of FIG. 1, the information retrieval system of the invention includes an input/output process, a query generation process, a search process that involves a large domain of textual data (typically in the multiple gigabyte range), an organizing process, presentation of the information to the user, and a process to identify and characterize the types of documents contained in the large domain of data.

Figure 2:
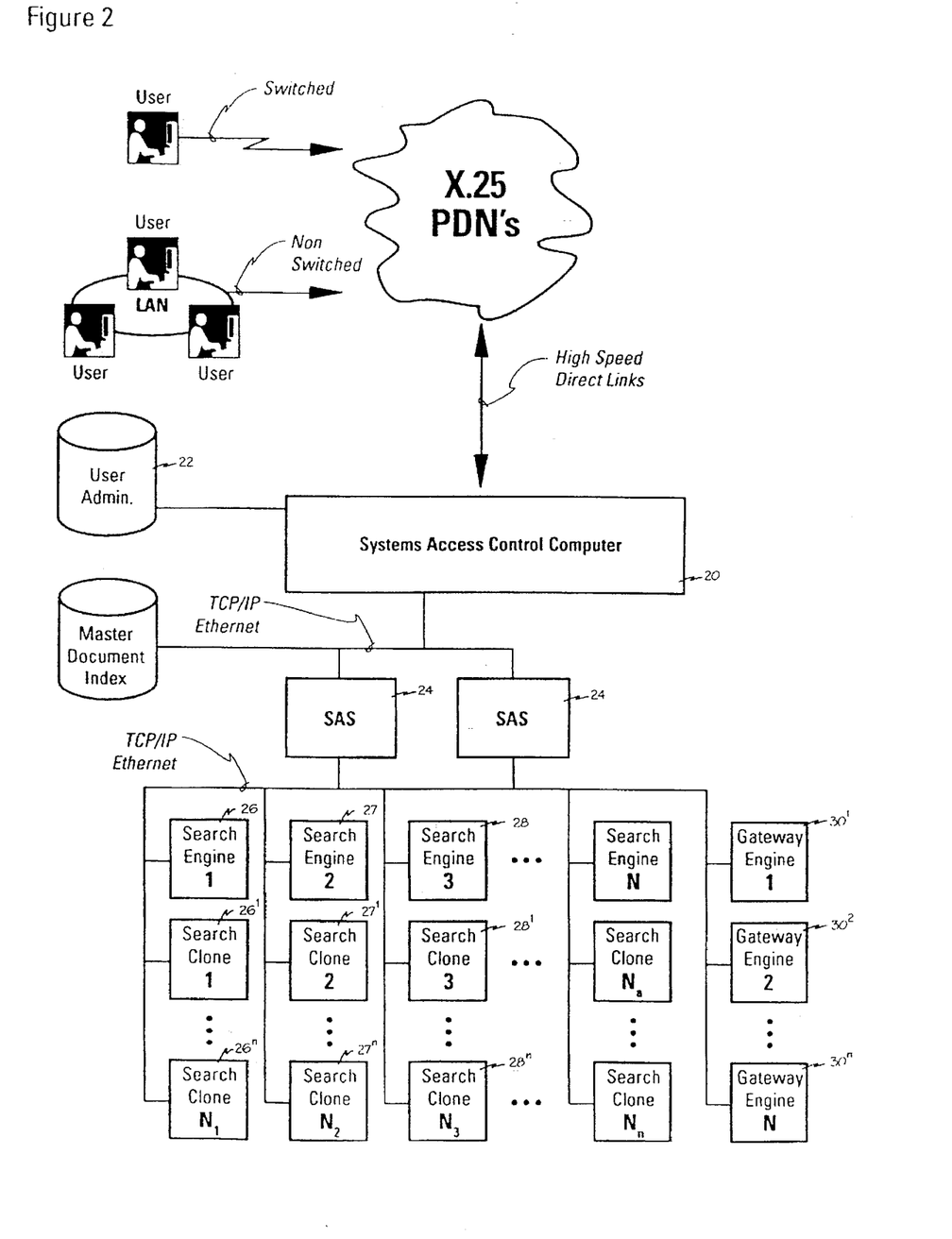
FIG. 2 is a block diagram illustrating computer and telecommunication hardware which may be utilized in the invention.

Referring to FIGS. 1 and 2, a user utilizes an input/output device to gain access to the system of the invention. Such input/output device may be any type of computer terminal capable of communicating with the searching hardware and software. Although such a terminal might be linked directly to the searching hardware and software, typically a standard personal microcomputer or work station (including a monitor and a keyboard) with a modem would be utilized from a remote location; alternately, the device may be simply a computer terminal (such as a vt100) with a modem, operated from a remote location. In each such situation, however, queries are entered utilizing the input/output device, and search results are displayed on such device.

Through their input/output devices, remote users access the systems access control computer 20 through an X.25 public data network or similar communication means. Users may choose from a variety of standard telecommunication systems to connect with the systems access control computer, such as Compuserve, GTE Telenet, BT TymeNet, Internet, etc. Alternately, the user could place a direct call to the computing system.

The systems access control computer 20 (or computers, if concurrent communication traffic requires multiple units) accepts calls from users and validates their personal identification numbers. This computer 20 preferably utilizes non-stop processing architecture such as those available from Stratus Computer Corp., Marlboro, Mass., or Tandem Computers Inc, Cupertino, Calif. The number of computers 20 required for this task typically is determined by the number of connections required to insure that a caller in the busiest period of the day will have a very low probability of receiving a busy signal and be unable to connect to the system. A user administration relational database 22 contains all the information utilized by the access control computer 20 in controlling access to the system.

When an end user is accepted by the access control computer 20 as a valid user, the user is then connected with a Search Administration Server (SAS) 24. Typically at least two SAS systems 24 are used to manage a domain of information (unless a non-stop processing system is used) to insure maximum system availability. The number of SAS systems 24 required again depends on the volume of use the system handles and the target response time in the busiest portion of a day; this can be determined using well-known standard queuing models associated with multitasking processes.

The SAS systems 24 conduct the appropriate dialogue with the end user to elicit a query from the user identifying what information the user is seeking. The SAS system 24 can operate in two very distinct modes.

One mode supports end users that are calling with a simple keyboard/display device such as a Digital Equipment Corporation VT100 terminal (or equivalent terminal). In this mode the SAS system 24 generates screens of display and monitors the keyboard responses entered by the user to establish the information sought and present the search results by category.

The second mode supports connections from remote computing systems. In this mode the SAS system 24 accepts and executes transactions from a predefined set that allows for a query to be generated, search to be run, and search results presented. In this mode the remote computing system is in complete control of the end user's display screen and is responsible for the look and feel of the end user activity. This well-known mode of operation is commonly described as a Client/Server Architecture.

Regardless of the mode of operation, at some point the SAS system 24 is presented with a query representing a request for information by the user. This query is composed of terminology describing the various forms the information might be stated in, typically along with Boolean connectors to control the precision (i.e., the relevance) of documents retrieved.

The SAS system 24 includes a display of the search server complex that indicates the number of columns in the complex, each column including a search engine 26, 27, 28, etc., respectively, and, optionally, one or more search clones 26', 26", . . . 26"; each of the search clones is, in effect, a replica of the search engine in that column, redundancy being provided to permit simultaneous searching (with predictable response times) of the domain of data managed by a particular search column. The SAS system 24 broadcasts the user's search to the complex of search machines. It waits for a signal from a machine in each column in the complex to insure that the entire domain will be searched. If after an appropriate time a machine in one or more columns has not responded that it has accepted the query and queued it for processing, the SAS 24 will inform the user that the search will not be completed across the entire domain and ask if the user wishes to continue. This typically would occur only if multiple search engines are not operational.

If all columns respond or the user indicates that the partial search is acceptable then the SAS 24 waits on each column that accepted the query to begin to report its results to it. As these results are received each document returned is identified by document type and assigned to a particular category in a predetermined set of categories. The system permits different sets of categories to be available for use, but preferably only one set of categories is associated with a single user. As described below, the various sets of categories allow a single document in a domain to be placed in different categories depending on which set of categories is being used; the selection of which set of categories is to be used typically is based upon the identity of the user or a predetermined characteristic of the user (such as the user's professional training or technical discipline or any other relevant criteria). This facilitates presentation of search results utilizing terminology and groupings of document types that are relevant and logical to the user, preferably eliminating duplicate documents discovered in the search of the domain. An advantage that this capability gives to the system is that the user's time is saved finding relevant search results, without compromising the thoroughness of the search, thereby resulting in significant time savings to the user in comparison to a search of similar thoroughness utilizing existing database sources and retrieval systems.

When all results are reported (i.e. all columns have indicated they are finished), the SAS 24 organizes the documents into the above-described categories and in the correct order for display, utilizing a predetermined key (such as the date of the publication, the publisher, and/or alphabetical priority of the document, etc.) that is generated for each document when it is loaded into the database. Display of the information to the user is usually in reverse chronological by date published but can be based on any content of the document, as desired. Once the sorting is complete, search results are presented by category to the user.

The Search Engine Systems (SES) 26, 27, 28, etc., (i.e., the search engines plus the corresponding search clones) house the documents that make up the domain of information. These systems are a collection of loosely coupled engines which may, if desired, have very different architectures and search algorithms, as may be desired based on the type of material (i.e., documents) they manage. Though many of the SES engines may function differently, they must all be able to communicate with the SAS 24; this can be accomplished, e.g., by having them all support an ethernet or FDDI hardware interface and the TCP/IP communication protocol.

It is possible that a single document collection may need to be indexed by two or more SES units. For example, particular material that has unique indexing requirements may be indexed in a required (or desired) unique manner without imposing the technique on the entire domain. This makes the overall system much more cost effective than other systems, and is totally transparent to the query generation process and end user. Moreover, it facilitates effective and efficient search strategies, producing a high level of relevancy in retrieval across a widely varied domain of information.

An additional SES type is shown on FIG. 2 as a series of gateway engines 30. The gateway engines $30_1$, $30_2$, ... $30_n$ allow the query being processed to be re-routed to a source that is external to the search server complex shown on FIG. 2. Such external sources may be housed in a completely different computing system that is remote to the main document collection and typically not part of the business unit delivering search results. The gateway servers 30 connect to such remote sources using various telecommunication facilities (such as those used by end users to access the information management system) through which they would conduct an appropriate search and retrieve the results. Again, such remote processes would be transparent to the query generation process and to the end user, with the possible exception that the response time to a query from this type server would be dictated by the remote system and could be substantially different from the normal SES system response time.

As shown in FIG. 2, the SES systems are organized in columns. The number of columns required is dictated by the hardware processing system selected, the targeted maximum search response time required, the size in gigabytes of the domain, the number of alternate search techniques incorporated in the domain, the presence of gateway servers 30, and the number of simultaneous queries that must be processed in the busiest period of searching.

As noted above, clone systems or "rows" may be created within a single column based upon the expansion of simultaneous demand. Each search clone 1 has all the same data and all the same search capability as its corresponding search engine 1 (they are, in effect, redundant); multiple clones are provided so that more simultaneous requests can be processed in that particular domain with predictable response times. It is possible (but not typical) that different columns would have a different number of rows if they were supporting the same basic type of search activity.

The number of gateway clones 30 required is determined by the level of effort required to re-route and manage search queries being launched to information sources outside the system, and thus would be determined independently from the number of search engine clones.

Although the system of the invention is illustrated, and generally described, as always searching substantially all of the data stored in the system, it is possible to effectively utilize the system of the invention on only selected columns of the entire data domain in some circumstances. For example, in some circumstances certain users may have access to private collections of documents that are not available to all users of the domain. These documents would be kept in collections/columns isolated from the rest of the domain. The SAS upon recognizing that a user had fights to a private column would include it in the search. These fights would be found in the user administration file.

Figure 3:
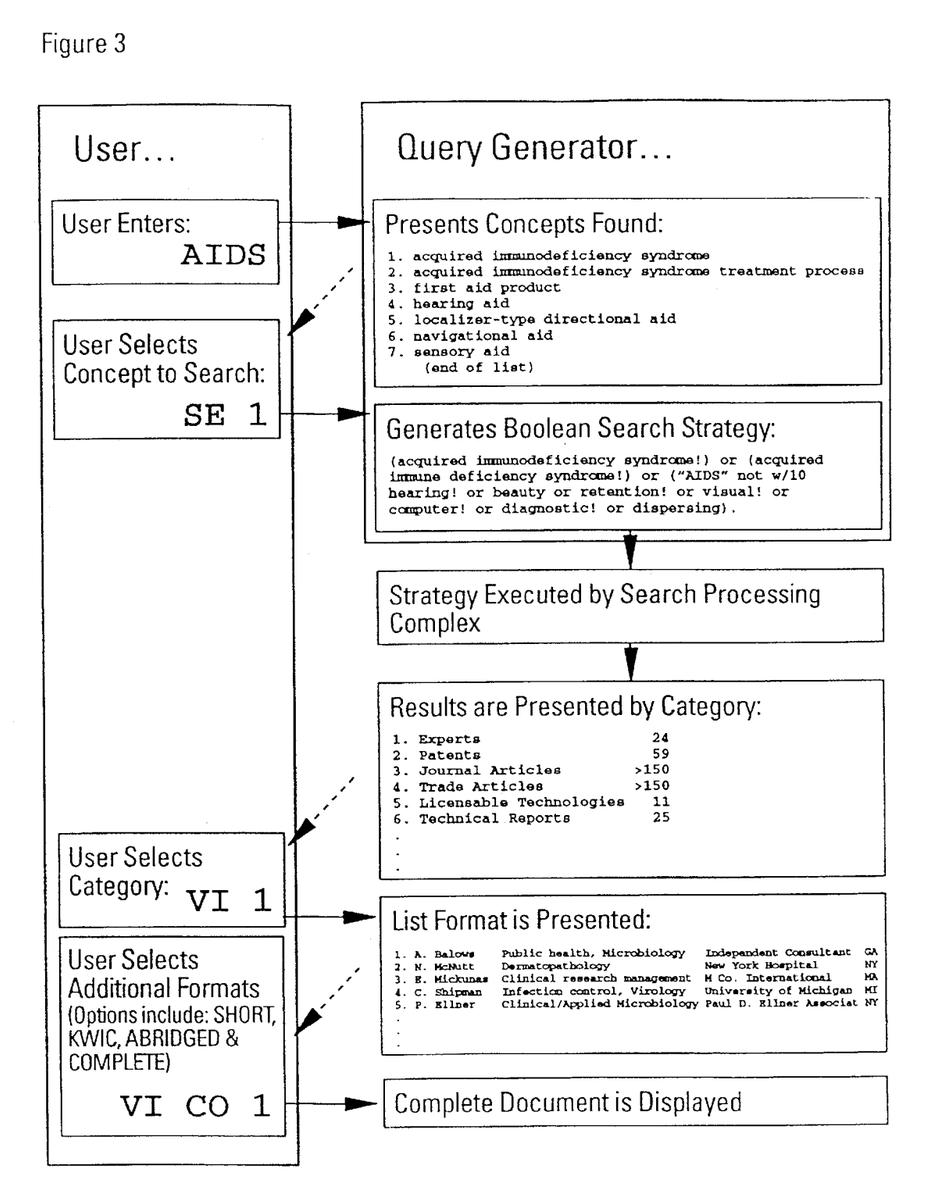
FIG. 3 is a diagram illustrating a query formulation and search process utilized in the invention.

Turning now to FIG. 3, the query generation process preferably includes a knowledge base containing a thesaurus and a note pad, and preferably utilizes embedded predefined complex Boolean strategies. Such a system allows the user to enter their description of the information needed using simple words/phrases made up of "natural" language and to rely on the system to assist in generating the full search query, which would include, e.g., synonyms and alternate phraseology. Systems of this type are known in the industry including, e.g., Westlaw's "WIN" system (see, e.g., Pritchard-Schoch, *Natural Language Comes of Age*, Online, pages 33–43, May 1993).

As illustrated in FIG. 3, a user enters a word/phrase describing the technical topic about which knowledge is sought. In the example illustrated in FIG. 3, the term "AIDS" has been entered by the user. The thesaurus is scanned and a list of technical concepts related to the word/phrase entered is returned. In this case, the thesaurus has returned concepts such as "acquired immunodeficiency syndrome", "first aid product", "navigational aid", etc. The user reviews the concepts found and saves relevant ones to the note pad (thereby discarding irrelevant possible connotations of the word/phrase entered). For each concept found the user can have the thesaurus show a description of the concept and other concepts that are related to it. The user will be shown:

Broader: Concepts listed under this section are less specific than the one selected.

Narrower: Concepts listed under this section are more specific than the one selected.

Related: Concepts listed under this section are related to the one selected. For example the concept "tire" is related to the concept "automobile." In this example the relationship is that one concept is a component of another. The universe of possible relations is wide, and could include, e.g.: component of, sibling of, direct product of, opposite of, precursor of, version of, associated discipline, not related to, contrast with, used in, class of, instance of, form of, role of, caused by, counteragent of, produces/produced by, property of, measured in, and measured by.

Process On: These are concepts that can act as a "process on" the concept selected. For example the concept "cutting" can be a "process on" metal.

Thus, entering the word "cutting" will return concepts, under the "Process On" heading, such as metal, paper, and wood.

Processed By: These are concepts that can be "processed by" the concept selected. For example, the concept "metal" can be "processed by" metal cutting. Thus, entering the word "metal" will return concepts, under the "Process By" heading, such as cutting, forging, and drawing.

The note pad is continually updated as the user selects additional relevant terms associated with the word/phrase for later use in creating search strategies. Users may enter additional words/phrases associated with the desired topic. Users then create and execute search strategies using one or more concepts saved on the note pad. The system translates these concepts into complex Boolean search strategies and automatically executes these strategies.

Referring again to the example shown in FIG. 3, after entering the term "AIDS" the thesaurus presented a variety of possible meanings for this term. If the user selects (by entering the command "SE 1" or an equivalent command) the first meaning presented, i.e., "acquired immune deficiency syndrome" the system automatically executes an embedded Boolean search strategy such as "(acquired immunodeficiency syndrome!) or (acquired immune deficiency syndrome!) or ("AIDS" not w/10 hearing! or beauty or retention! or visual! or computer! or diagnostic! or dispersing)." This complex search strategy includes synonyms for the disease, and excludes concepts wit the same spelling but with different meanings such as hearing aids. The user is not required to know Boolean logic or to anticipate all of the unintended meanings of relevant words utilized in the search strategy, but has been able to launch a relatively sophisticated and accurate search query just by inputting a query in "natural language".

Upon completion of the searching process by the search processing complex in response to the query, the results of the search are presented to the user by category type (as described below in greater detail). In the example of FIG. 3, the search result identified 24 experts, 59 patents, 150 journal articles, etc. The user then can select the category to view-again, in the example, the user has selected category 1 by issuing the command "VI 1", and a list of the experts identified in the search is displayed in summary format. The user can then request, by a command such as "VI CO 1", to view the complete document selected from the list, giving, in this case, complete information about the identity and credentials of the expert.

Preferably the search process incorporates search engines designed to utilize the Boolean method of retrieval for textual dam, accompanied by an inverted file structure that is utilized to speed up retrieval. Boolean logic search software is readily available for purchase from such companies as InfoPro Technologies, McLean V; Folio, Provo, Utah; and Fulcrum, Ottawa, Canada. Complete descriptions of the Boolean language and accompanying file structures are available from these companies. Each supplier of Boolean software also specifies the file structure of the domain. Most software packages make use of an inverted file structure because it dramatically speeds up retrieval, although such a file structure is not strictly required.

Figure 4:
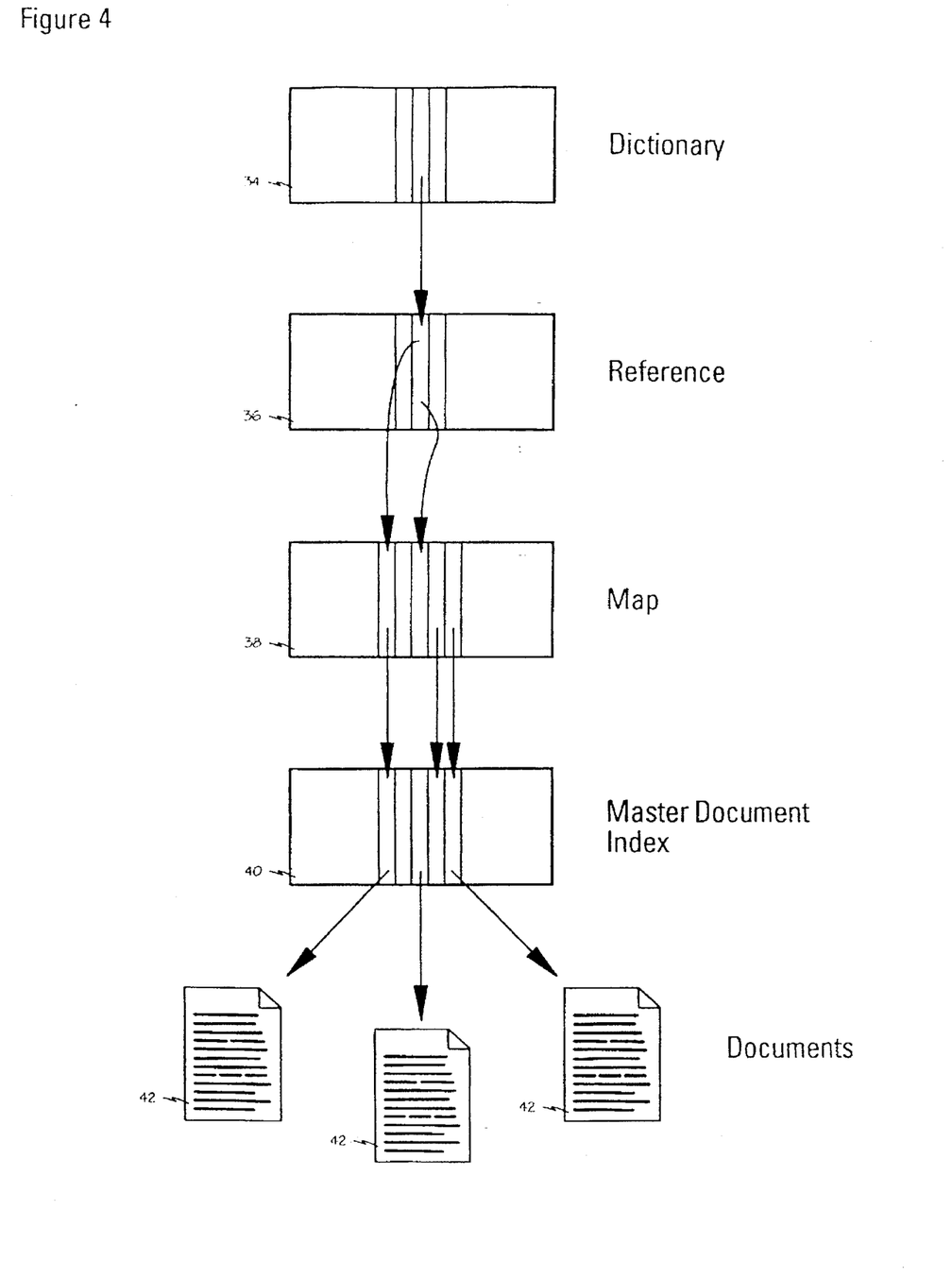
FIG. 4 is a block diagram illustrating an inverted file structure which may be utilized in the invention.

A preferred fully inverted file architecture is illustrated schematically in Figure 4, and is commercially available from Fulcrum, Ottawa, Canada. In such a system, a dictionary 34 contains an entry for each searchable term (word) in the document collection, with a pointer to further information stored in reference file 36. The entries are ordered alphabetically.

Data in the reference file 36 is stored in a compressed format, and contains detailed information on the exact locations of words within documents 42. This information is used to resolve phrase and proximity requests as well as those for simple word combinations.

The index files (i.e., the dictionary and reference files) are maintained by an indexing engine and are used by the search engine to resolve queries. These files are updated when the indexing engine is used to process the batch of documents which have been modified or added since the last update cycle.

A catalog 40 contains one entry for each document 42 in a collection. It may be thought of as defining the collection: all those documents 42 and only those documents with entries in the catalog 40 are indexed and are subsequently retrievable. Each catalog entry is identified by a unique system-assigned identifier (called a catalog id or CID).

If a document's text is stored in an operating system file outside of the catalog, the catalog entry contains physical information such as the operation system file name, the filters used to read the text and the file's last modified date. In this manner, the catalog effects a mapping between catalog id and the operating system filename.

In addition, the catalog entry for each document may store information which pertains to that document but which is not found in the external operating system file. This information is stored as an arbitrary number of fields, each of which is separately indexable and searchable. Each field typically contains text. Numeric information, such as dates, may also be stored in catalog fields, permitting numeric range searching.

The catalog map 38 file provides a mapping from the catalog id (CID) of each record to the location of corresponding data in the catalog 40. The catalog map 38 may also contain minimal status information concerning each catalog entry.

The large (gigabytes) domain of archived textual data searchable by the system of the invention consists typically of technical, business and other information licensed from database producers, information licensed from publishers, and information created by the owner of the information retrieval system (though, of course, the system may be adapted for use with any type of information desired). The information may be presented to the user in various formats, including but not limited to abstracts, excerpts, full text, or compound documents (i.e., documents that contain both text and graphics).

Figure 5:
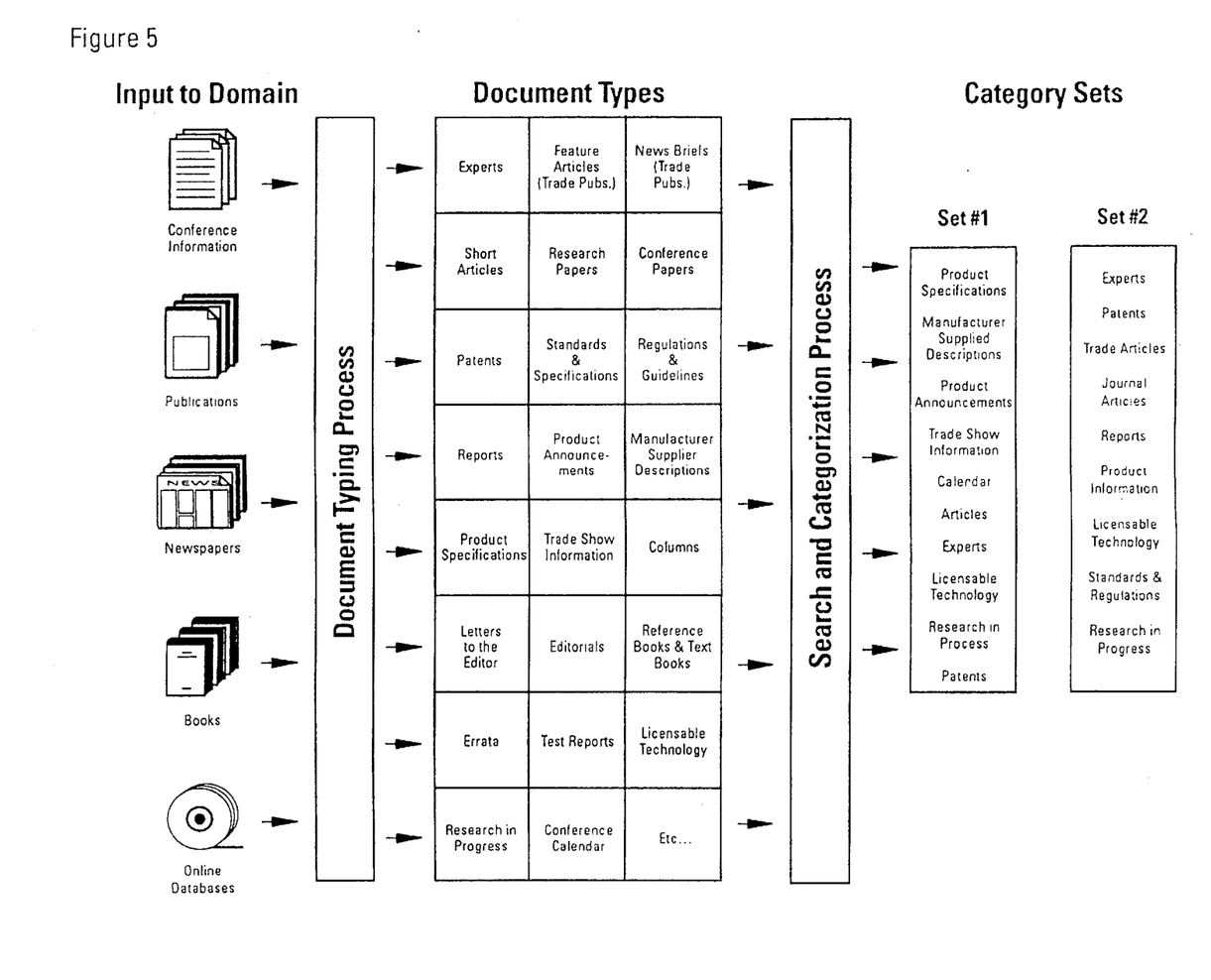
FIG. 5 is a diagram illustrating a sorting process for organizing and presenting search results.

FIG. 5 illustrates how five typical sources of information (i.e., source records) can be sorted into many document types and then subsequently into categories. For example, a typical trade magazine may contain several types of information such as editorials, regular columns, feature articles, news, product announcements, and a calendar of events. Thus, the trade magazine (i.e., the source record) may be sorted into these various document types, and these document types in turn may be categorized or grouped into categories contained in one or more sets of categories; each document type typically will be sorted into one category within a set of categories, but the individual categories within each set will vary from one set to another. For example, one set of categories may be established for a first characteristic type of user, and a different set of categories may be established for a second characteristic type of user. When a user corresponding to type #1 executes a search, the system automatically utilizes the categories of set #1, corresponding to that particular type of user, in organizing the results of the search for review by the user. When a user from type #2 executes a search, however, the system automatically utilizes the categories of set #2 in presenting the search results to the user.

Turning again, then to the trade magazine example, when the magazine is loaded into the system, a text analysis process identifies each unique document type within the magazine with a code and this code is utilized by the system, in conjunction with the predetermined sets of categories, to organize search results by document types into categories at the end of each search. (An alternative to marking individual document types with document type codes is to sort them into categories at the time they are loaded into the system and then search the individual categories; however, this may require documents to be stored more than once in the domain in order to customize categories for different types of users.) If the user corresponds to category #1 (see FIG. 5), then the number of documents responsive to the search query that fall into the categories of "product specifications," "manufacturer supplied descriptions," "product announcements," and "trade show information" are all summarized separately. On the other hand, if the user corresponds to category #2, then all of the documents responsive to the search query that fall within these categories are lumped together in the category "Product Information" in categories set #2. Thus, the same query launched by two users corresponding to different categories will yield the same answer set, but the answer set will be summarized differently for the two individuals, each being tailored to their particular needs. This customization of the summary of the search results facilitates review of the search results, saving time for the user and reporting the results in a manner that is uniquely relevant to him or her.

The sets of categories utilized by the system may be based upon any relevant criteria relating to the types of users who will utilize the system. For example, the sets of categories may be based upon the professional class of the user—i.e., legal, business, technical, etc. Within such broad classes further distinctions could be made; for example, technical users could be further identified by technical discipline (such as chemical, electrical, mechanical, medical, etc.). Alternately, users could be identified by industry, with or without regard to professional class or technical discipline (such as lumber, medicine, glass manufacturing, etc.). Other possible methods for determining sets of categories could include geographical location of the user, the company the user works for, terminology most familiar to the user, or any other relevant user characteristic. Also, in some cases categories with identical content could be given different names, again depending on the terminology most familiar or useful to the user. Alternately, if desired, the user may be permitted to select which of several sets of categories should be used by the system in reporting results, and, if desired, which categories of document types will be utilized in a particular selected category set (i.e., the user may be able to customize not only which category set will be used, but will be able to customize which document types will be lumped together in a particular category and/or what name will be given to such a customized category containing multiple document types).

The collections of textual data (i.e., the source records) are typically obtained either in electronic form, or are obtained in hard copy form and then converted to electronic form. In either case, the electronic form is loaded into the appropriate search engine(s) of the system. During loading, the process to identify and code information by document type is typically accomplished by a combination of automated and manual coding. Also, at the time of loading duplicate documents from multiple sources preferably are identified and removed so that the results from a search query will not include redundant or duplicate documents. Duplicate documents may be identified by matching information associated with a document such as key words in the title, authors, and date of publication. Alternately, redundant abstracts of a single title may be stored as unique text segments of a single document.

As indicated above, the sorting process takes query search results and sorts all relevant document identified as meeting the search criteria into the predetermined categories of documents that are specific to the category set corresponding to the user rather than specific to the sources/publishers of the information (in contrast to existing information retrieval systems such as Dialog, etc.). Sometimes these categories may have a one-to-one relationship with the document types (for example, patents may be both a document type and a category) identified in the loading process (described above) or these categories may be comprised of several document types (for example, for some users product announcements, product reviews, and product specifications may be grouped into a category labeled "product information").

The results of the search and sorting processes are presented to the user summarized by categories along with the number of documents in each such category. Unless all duplicates were removed at the time the source records were input to the system, any duplicate documents retrieved may be removed at this time by comparing titles, authors, and publication date. The naming or labeling of categories is based on the identity of the user (or a personal characteristic of the user, as detailed above) rather than the organization of the domain being searched, and is accomplished without duplicating the document in the domain. Category labels are easily changed and expanded without reloading existing documents as new categories are encountered as the domain grows over time. In contrast, typical on-line systems currently in use present search results as the number of hits in reverse chronological order sorted by the data supplier or source searched. In these prior art systems the output usually is a function of the order of sources selected for searching.

For example, to conduct a search on the topic of neon lasers in a typical on-line system the user must first select a database and then enter a search strategy. In response to the search query, the user will be presented with a display such as "233 neon lasers". This display means there are 233 documents retrieved responsive to the search query. The documents may be of any document type contained in the database selected, and are all co-mingled. Issuing a command to display the documents retrieved will result in a reverse chronological sort (newest to oldest) of the comingled document types. Moreover, only documents contained in the selected database are identified. In contrast, the system of the invention not only searches substantially its entire domain (not just a single database or a few selected databases), but also summarizes the results by category of document type.

The user is able to view multiple formats of the documents by category. FIG. 3 refers to a sampling of formats that are possible, such as "short", "KWIC" (key word in context), "abridged" and "complete." Other formats can be utilized as desired. The formats allow the user to display all or just certain portions of a document. Users typically will scan portions of a document to ensure relevancy before issuing the command for the complete document in order to save time and money.

The information storage, searching and retrieval system of the invention resolves the common difficulties in typical on-line information retrieval systems that operate on large (e.g., 2 gigabytes or more) domains of textual data, query generation, source selection, and organizing search results. The information base with the thesaurus and embedded search strategies allows users to generate expert search queries in their own "natural" language. Source (i.e., database) selection is not an issue because the search engines are capable of searching substantially the entire domain on every query. Moreover, the unique presentation of search results by category set substantially reduces the time and cost of performing repetitive searches in multiple databases and therefore of efficiently retrieving relevant search results.

While a preferred embodiment of the present invention has been described, it should be understood that various changes, adaptations and modifications may be made therein without departing from the spirit of the invention and the scope of the appended claims.

What is claimed:

1. An information storage, searching and retrieval system for large domain archived data of various types comprising:
    means for storing a large domain of data contained in multiple source records, at least some of the source records being comprised of individual documents of multiple document types;
    means for searching at least a substantial portion of such data based on a search query to identify documents of multiple types responsive to the query; and
    means for categorizing documents responsive to the query based on document type, including means for generating a summary of the number of documents responsive to the query which fall within various predetermined categories of document types.

2. The system of claim 1 wherein the means for categorizing documents and generating the summary includes a plurality of predetermined sets of categories of document types.

3. The system of claim 2 wherein the means for generating the summary includes means for customizing the summary for the user by automatically selecting one of the sets of categories for use in preparing the summary, such set of categories being selected based on predetermined criteria relating to a code identifying the user or a personal characteristic of the user, so that the summary for an individual user is automatically customized for the user based on such code identifying the user or the personal characteristic of the user.

4. The system of claim 2 wherein the means for generating the summary includes means for customizing the summary for the user by permitting the user to select one of the predetermined sets of categories for use in customizing the summary.

5. The system of claim 2 wherein the means for categorizing documents and generating the summary includes means for predetermining the sets of categories of document types based on user inputs.

6. The system of claim 5 wherein the means for predetermining the sets of categories includes means permitting the user to customize the set of categories of document types to be utilized.

7. The system of claim 2 wherein the means for categorizing documents and generating the summary includes means for predetermining the categories of document types based on user inputs.

8. The system of claim 7 wherein the means for predetermining the categories of document types includes means permitting the user to customize the categories of document types to be utilized.

9. The system of claim 1 wherein the means for categorizing documents and generating the summary includes a plurality of predetermined sets of categories of document types, and further includes means for automatically customizing the summary by automatically selecting one of the sets of categories, based on a code identifying the professional class of the user, for use in preparing the summary, so that the summary for an individual user is automatically customized to the user's professional class.

10. An information storage, searching and retrieval system for large domain archived data of various types comprising:
    means for storing a large domain of data contained in multiple document types;
    means for searching at least a portion of such data based on a search query to identify documents of multiple document types responsive to the query; and
    means for categorizing documents responsive to the query based on document type, including means for generating a summary of the number of documents responsive to the query which fall within various predetermined categories of document types.

11. The system of claim 10 wherein the means for categorizing documents and generating the summary includes a plurality of predetermined sets of categories of document types, each category in a set corresponding to one or more document types.

12. The system of claim 11 wherein the means for generating the summary includes means for customizing the summary for the user by automatically selecting one of the sets of categories for use in preparing the summary, such set of categories being selected based on predetermined criteria relating to a code identifying the user or a personal characteristic of the user, so that the summary for an individual user is automatically customized for the user based on such code identifying the user or the personal characteristic of the user.

13. The system of claim 10 wherein the means for generating the summary includes a plurality of predetermined sets of categories of document types, each category corresponding to one or more document types, the means for generating the summary further including means for automatically customizing the summary by automatically selecting one of the sets of categories, based on a code identifying the professional class of the user, for use in preparing the summary, so that the summary for an individual user is automatically customized to the user's professional class.

14. An information storage, searching and retrieval system for large domain archived data of various types comprising:
    means for storing a large domain of data contained in multiple source records, at least some of the source records being comprised of individual documents of multiple document types;
    means for searching at least a substantial portion of such data based on a search query to identify documents of different document types responsive to the query; and
    means for categorizing documents responsive to the query based on document type and independently of the source record from which such documents were obtained, including means for generating a summary of the number of documents responsive to the query which fall within each of the document types.

15. The system of claim 14 wherein the means for generating the summary includes one or more predetermined sets of categories of document types, each category corresponding to one or more document types, and further includes means for summarizing the number of documents responsive to the query which fall within the various predetermined categories of a selected one of such sets of categories.

16. The system of claim 15 wherein the means for generating the summary includes means for customizing the summary for the user by automatically selecting one of the sets of categories for use in preparing the summary, such set of categories being selected based on predetermined criteria relating to a code identifying the user or a personal characteristic of the user, so that the summary for an individual user is automatically customized for the user based on such code identifying the user or the personal characteristic of the user.

17. A method of storing, searching and retrieving information for use with a large domain of archived data of various types comprising:

storing in electronically retrievable form a large domain of data contained in documents obtained from multiple source records, at least some of the source records containing documents of multiple types;

generating an electronically executable search query;

electronically searching at least a portion of such data based on the query to identify documents of multiple document types responsive to the query; and sorting documents responsive to the query and presenting a summary of the number of documents responsive to the query by type of document independently of the source record from which such documents were obtained.

18. A method of storing, searching and retrieving information for use with a large domain of archived data of various types comprising:

storing in electronically retrievable form a large domain of data contained in documents obtained from multiple source records, at least some of the source records containing documents of multiple types;

defining one or more sets of categories of document types, each category corresponding to one or more document types;

generating an electronically executable search query;

electronically searching at least a portion of such data based on the query to identify documents of multiple document types responsive to the query;

selecting one of the sets of categories for use in presenting a summary of the results of the search; and sorting documents responsive to the query by document type and, utilizing the selected set of categories, presenting a summary of the number of documents responsive to the query which fall within each category in the selected set of categories.

19. The method of claim 18 wherein the step of selecting one of the sets of categories is performed automatically based on predetermined criteria relating to a code identifying the user or a personal characteristic of the user.

20. The method of claim 16 wherein the step of selecting one of the sets of categories is performed automatically based on a code identifying the professional class of the user, so that the summary for an individual user is automatically customized to the user's professional class.

21. The method of claim 18 wherein substantially all of the data is searched based on the query.

22. An information storage, searching and retrieval system for large domain archived data of various types comprising:

means for storing a large domain of data contained in multiple source records, at least some of the source records being comprised of individual documents of multiple document types;

means for searching at least a substantial portion of such data based on a search query to identify documents of multiple types responsive to the query; and means for categorizing documents responsive to the query based on document type, including a plurality of predetermined sets of categories of document types, at least one of the categories in at least one of the sets corresponding to more than one document type, and means for generating a summary of the number of documents responsive to the query which fall within the various categories of one of such predetermined sets of categories.

* * * * *